Aug. 24, 1954   M. PAREDES   2,686,995
WORK GRINDER ATTACHMENT FOR LATHES
Filed Oct. 3, 1952   2 Sheets-Sheet 1

INVENTOR.
Marcelino Paredes,
BY
McMorrow, Berman & Davidson
ATTORNEYS.

Aug. 24, 1954     M. PAREDES     2,686,995
WORK GRINDER ATTACHMENT FOR LATHES
Filed Oct. 3, 1952     2 Sheets-Sheet 2
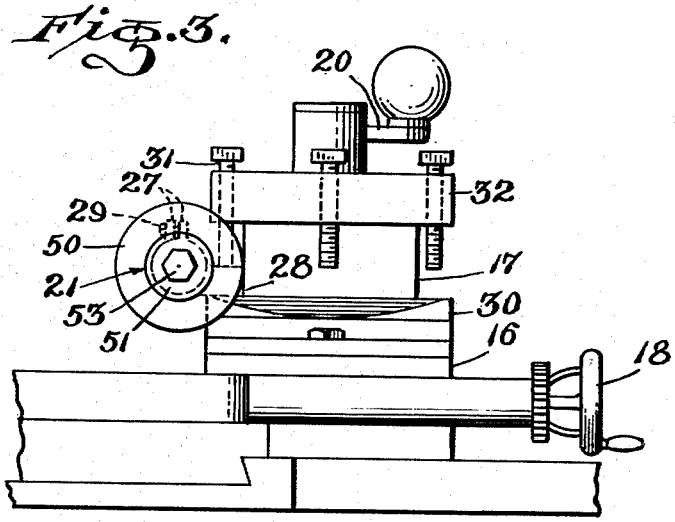
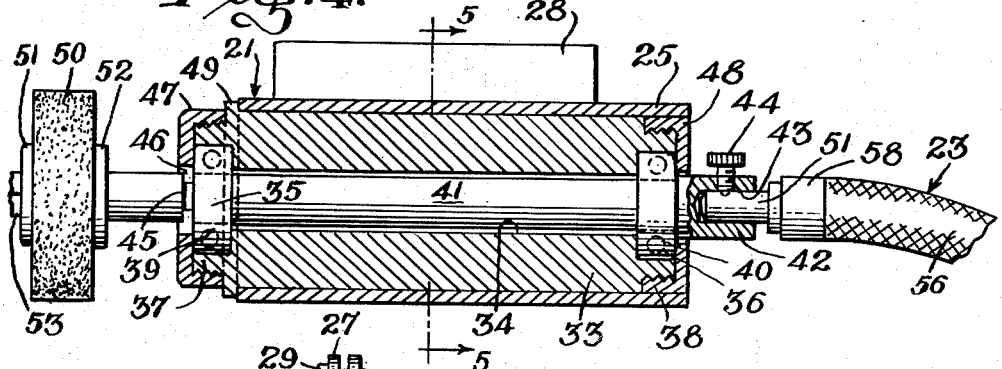
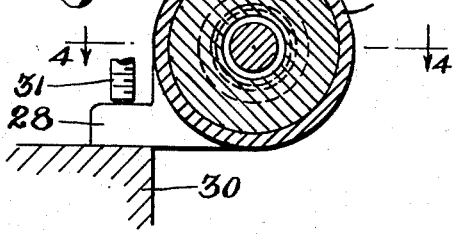
INVENTOR.
Marcelino Paredes
BY
McMorrow, Berman + Davidson
ATTORNEYS.

Patented Aug. 24, 1954

2,686,995

UNITED STATES PATENT OFFICE 2,686,995

WORK GRINDER ATTACHMENT FOR LATHES

Marcelino Paredes, Los Angeles, Calif.

Application October 3, 1952, Serial No. 312,983

1 Claim. (Cl. 51—259)

This invention relates to work grinding attachments for machine tools, such as lathes and milling machines, and more particularly to a work grinding attachment for a turret lathe.

It is among the objects of the invention to provide an improved work grinding attachment which can be installed on a turret lathe with no material modification of the lathe construction to provide a ground finish on work pieces carried by the lathe spindle; which includes a grinding head which can be detachably mounted on the turret of a turret lathe in a manner such that it does not interfere with the use of the lathe for operations other than grinding, a driving motor spaced from the lathe where it does not interfere with the operation of the lathe and is not subjected to lubricating and cutting oil used by the lathe, and a flexible shaft drivingly connecting the motor to the grinding head; which has a grinding head including a holder and grinding mechanism detachably secured to the holder so that the holder can be left permanently attached to the lathe turret, if desired, and the grinding mechanism changed for different operating conditions; which may be provided in different sizes for different lathes and may utilize grinding wheels of different sizes and shapes for different grinding operations; and which is simple and durable in construction, economical to manufacture, easy to install and use, and effective and efficient in operation.

Other objects and advantages will become apparent from a consideration of the following description and the appended claim in conjunction with the accompanying drawings, wherein:

Figure 3 is a side elevational view of the cross slide and lathe turret illustrated in Figure 2 with the grinding attachment mounted on the lathe turret;

Figure 4 is a longitudinal cross sectional view of the head of the grinding attachment; and Figure 5 is a transverse cross sectional view on the line 5—5 of Figure 4.

Figure 1:
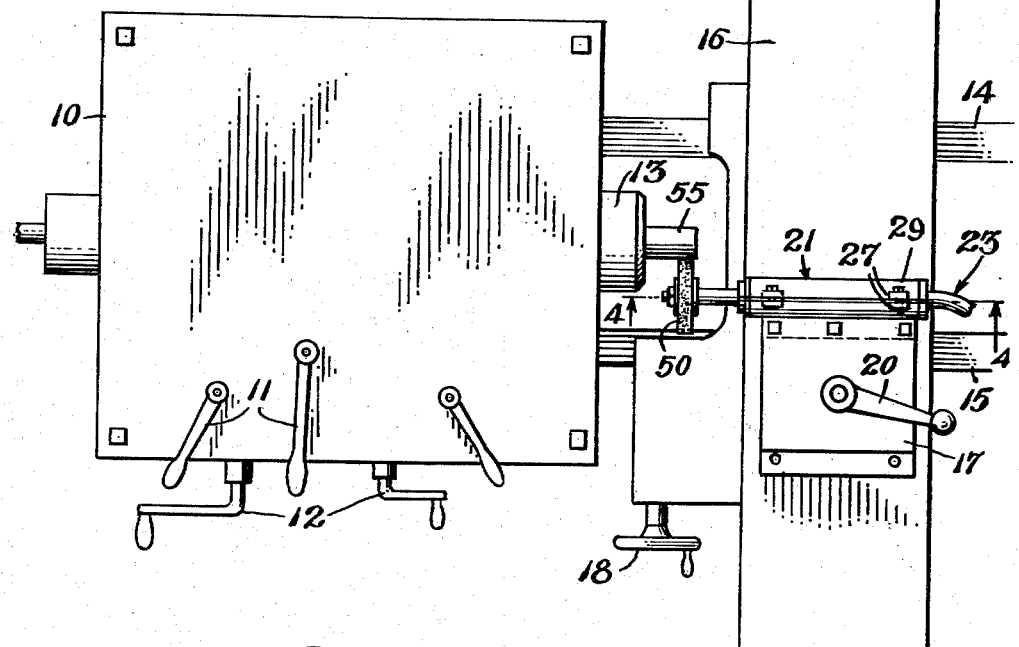
Figure 1 is a top plan view of a turret lathe with a work grinding attachment illustrative of the invention operatively mounted thereon.
Figure 2:
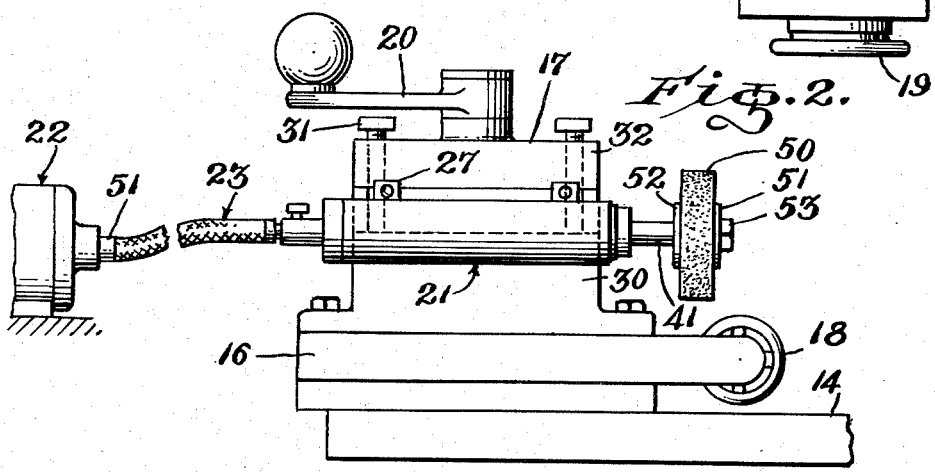
Figure 2 is an end elevational view of the cross slide and turret of the lathe showing the work grinding attachment mounted on the lathe turret.

With continued reference to the drawings, the lathe may be of well known construction and includes a spindle driving mechanism housing 10 equipped with control levers as indicated at 11 and control cranks, as indicated at 12, for controlling the operation of the lathe, a hollow or tubular spindle 13 extending through the housing 10 and driven by mechanism within the housing, such spindle having at one end a collet chuck or other suitable work piece engaging means, substantially parallel ways 14 and 15 extending from one end of the housing 10 and substantially horizontally disposed, a cross slide 16 mounted on the ways 14 and 15 and slidable therealong toward and away from the adjacent end of the spindle 13, and a tool carrying turret 17 mounted on the cross slide 16 and movable along the cross slide transversely of the ways 14 and 15 and also vertically movable. Movement may be imparted to the turret 17 longitudinally of the ways 14 and 15 by a suitable hand wheel 18 or by power operated means and horizontal movement transversely of the ways 14 and 15 may be imparted to the turret by a hand wheel 19 or by suitable power operated means known to the art.

The turret 17 as illustrated is a form known as a square turret and is capable of carrying up to four different tools which may be selectively brought into operative position relative to the end of the spindle 13 from which the work piece projects by rotation of the turret on the cross slide 16, the turret being locked in selected positions of angular adjustment relative to the cross slide by the locking handle 20 threaded at one end on a screw threaded shaft extending vertically through the turret.

As various forms of turret lathes are well known to the art, a more detailed description of the lathe is considered unnecessary for the purposes of the present disclosure.

The grinding attachment of the present invention comprises, in general, a head 21 detachably secured on the lathe turret 17, a driving motor 22 mounted at a location remote from the lathe where it is not subjected to the lubricating and cutting oil utilized by the lathe, and a flexible shaft 23 drivingly connecting the motor 22 to the grinder head 21.

The grinder head 21 includes a holder 25 in the form of a cylindrical sleeve having a milled slot 26 extending longitudinally thereof from one end to the other, apertured ears, as indicated at 27 projecting radially from the sleeve and arranged in pairs of opposed ears disposed one pair at each end of the slot with the two ears of each pair disposed at respectively opposite sides of the slot, and a web 28 extending longitudinally of the sleeve and projecting outwardly therefrom at a location angularly spaced from the slot 26. Clamp bolts 29 extend one through each pair of ears 27 for contracting the sleeve 25 for a purpose to be presently explained and the web 28 is disposed on the turret base 30 and clamped against the base by set screws 31 extending through tapped holes in the top plate or cover 32 of the turret which is disposed above and substantially parallel to the top surface of the base 30. The sleeve is thus firmly clamped to the turret in position such that it extends along one of the straight edges of the turret and may be left permanently attached to the turret, if desired.

A cylindrical core 33 having an outside diameter substantially equal to the inside diameter of the sleeve 25 is disposed in the sleeve and secured therein by tightening the clamp bolts 29. This core 33 has a coaxial bore 34 extending therethrough and counter bores 35 and 36 disposed one at each end of the bore 34. The core is provided with externally screw threaded portions of reduced diameter 37 and 38 surrounding the counter bores 35 and 36 respectively and anti-friction ball bearings 39 and 40 are disposed in the counter bores 35 and 36.

A shaft 41 extends through the bore 34 and is journaled in the anti-friction bearings 39 and 40 and this shaft is provided at one end with a portion 42 of increased diameter the inner end of which constitutes a shoulder bearing against the outer side of the inner race of the ball bearing 40. This enlarged portion 42 is provided with a coaxial well or blind bore 43 and with a radially disposed tapped hole opening into the well 43 and receiving a set screw 44. Intermediate its length the shaft 41 is provided with an annular groove 45 and a split spring ring 46 is disposed in this groove and bears against the outer side of the inner race of the anti-friction bearing 39, the shoulder provided at the inner end of the enlarged portion 42 of the shaft and the ring 46 maintaining the shaft against longitudinal movement relative to the anti-friction bearings 39 and 40.

Internally screw threaded flanged caps 47 and 48 are threaded onto the reduced end portions 37 and 38 of the core 33 and bear against the outer sides of the outer races of the anti-friction bearings 39 and 40 to hold the bearings against movement relative to the core 33, this core being clamped by the clamp screws 29 against movement relative to the holding sleeve 25.

At the inner end of the cap 47 the core 33 is provided with an annular bead or flange 49 which bears against the adjacent end of the holder sleeve 25 and limits movement of the core 33 through the sleeve in one direction. When the clamp screws 29 are loosened the core 33 can be slid out of the sleeve 25 by moving it in a direction relative to the sleeve such as to move the annular flange 49 away from the adjacent end of the sleeve and, when the core is reinserted in the sleeve this flange upon contacting the adjacent end of the sleeve positively positions the core in the sleeve.

A grinding wheel 50 is mounted on the shaft near the end of the shaft remote from the shaft enlargement 42 and at a location spaced from the flanged cap 47 and is held on the shaft by the compression washers 51 and 52 disposed at respectively opposite sides of the wheel and forced together by a nut 53 threaded onto the screw threaded end portion of the shaft.

With the grinding head 21 mounted on the turret 17 in the manner described above the grinding wheel 50 can be moved toward and away from a work piece 55 projecting from the end of the spindle 13 by movement of the turret along the cross slide 16 and can be moved longitudinally of the work piece by movement of the cross slide along the ways 14 and 15.

The flexible shaft 23 comprises a flexible outer casing or sheath 56, a flexible core extending through the sheath 56 and having rigid arbors, one of which is indicated at 57, journaled in bearings 58 and 59 provided one at each end of the sheath.

The arbor 51 is received in the well 43 in the enlarged end portion 42 of the shaft 41 and secured therein by the set screw 44 while the arbor at the other end of the flexible drive shaft is similarly secured to the shaft of the driving motor 22, so that the flexible shaft drivingly connects the motor 22 to the shaft 41 of the grinder head 21 and drives the grinding wheel 50.

The grinding attachments may obviously be made in different sizes for lathes or machine tools of different sizes and grinding wheels of different sizes and shapes may be provided for different grinding operations.

When it is desired to remove the grinding attachment from the lathe the flexible shaft 23 is disconnected from the head shaft 41 by loosening the set screw 44 and pulling the arbor 51 out of the well or bore 43. The clamp screws 29 are then loosened and the core 33 slid out of the sleeve 25 in the manner described above. As also explained above, the sleeve may be left permanently attached in its aligned condition on the lathe turret but, if it becomes necessary to use that portion of the turret for a different tool, the sleeve 25 may also be removed by loosening the set screws 31. The grinding attachment is reinstalled on the lathe by an obvious reversal of the above procedure.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A work grinder for a turret lathe comprising, in combination with a work-holding lathe spindle, a cross slide adjustable transversely and longitudinally of the spindle, and a turret including a base rotatably mounted on the cross slide: a sleeve extending normally to the axis of rotation of the base and carried by the base; a shaft journaled within and axially of the sleeve and projecting from the opposite ends thereof, one end of the shaft projecting beyond one side of the cross slide in the direction of the spindle; a grinder wheel secured to said end of the shaft for acting upon a work piece held by the spindle; a web rigid with and extending tangentially from the sleeve in contact with the base; a plurality of clamping screws carried by the turret and threadable downwardly into engagement with the web to clamp the same rigidly to the base; a flexible shaft secured to the other end of the first named shaft for driving the same; and a motor remote from the cross slide and having a driving connection to the flexible shaft.

References Cited in the file of this patent

UNITED STATES PATENTS

| Number | Name | Date |
|---|---|---|
| 1,010,565 | Ahlberg | Dec. 5, 1911 |
| 1,289,375 | Bright | Dec. 31, 1918 |
| 1,364,675 | Almfelt | Jan. 4, 1921 |
| 1,501,681 | Nielsen | July 15, 1924 |
| 1,859,068 | Beach | May 17, 1938 |

FOREIGN PATENTS

| Number | Country | Date |
|---|---|---|
| 208,437 | Great Britain | Dec. 20, 1923 |
| 829,258 | France | Mar. 21, 1938 |